(12) United States Patent
Setterberg et al.

(10) Patent No.: US 9,971,434 B2
(45) Date of Patent: May 15, 2018

(54) METHOD AND SYSTEM FOR ESTIMATING FINGER MOVEMENT WITH SELECTION OF NAVIGATION SUBAREAS

(71) Applicant: Fingerprint Cards AB, Göteborg (SE)

(72) Inventors: Eric Setterberg, Västra Frölunda (SE); David Carling, Mölndal (SE)

(73) Assignee: FINGERPRINT CARDS AB, Göteborg (SE)

( * ) Notice: Subject to any disclaimer, the term of this patent is extended or adjusted under 35 U.S.C. 154(b) by 25 days.

(21) Appl. No.: 15/359,114

(22) Filed: Nov. 22, 2016

(65) Prior Publication Data
US 2017/0168600 A1    Jun. 15, 2017

(30) Foreign Application Priority Data

Dec. 10, 2015   (SE) ...................................... 1551620

(51) Int. Cl.
| | |
|---|---|
| *G06F 3/00* | (2006.01) |
| *G06K 9/00* | (2006.01) |
| *G06F 3/041* | (2006.01) |
| *G06F 3/03* | (2006.01) |
| *G06K 9/52* | (2006.01) |
| *G06K 9/62* | (2006.01) |
| *G06F 3/0354* | (2013.01) |

(52) U.S. Cl.
CPC ............ *G06F 3/041* (2013.01); *G06F 3/0304* (2013.01); *G06F 3/03547* (2013.01); *G06K 9/00013* (2013.01); *G06K 9/00335* (2013.01); *G06K 9/52* (2013.01); *G06K 9/6215* (2013.01); *G06F 2203/0338* (2013.01)

(58) Field of Classification Search
CPC .... G06F 3/041; G06F 3/0304; G06F 3/03547; G06K 9/00013; G06K 9/00335; G06K 9/52; G06K 9/6215
See application file for complete search history.

(56) References Cited

U.S. PATENT DOCUMENTS

| | | | |
|---|---|---|---|
| 6,408,087 B1 | 6/2002 | Kramer | |
| 7,079,883 B2 * | 7/2006 | Marino | ............... A61B 5/04012 128/898 |

(Continued)

OTHER PUBLICATIONS

International Search Report for International Application No. PCT/SE2016/051205 dated Mar. 29, 2017, 4 pages.

*Primary Examiner* — Kevin M Nguyen
(74) *Attorney, Agent, or Firm* — RMCK Law Group PLC (57) ABSTRACT

A method of estimating a finger movement comprising acquiring a navigation evaluation image from each of at least three navigation subareas of a fingerprint sensor; determining, for each of the navigation evaluation images, a navigation-related property of the navigation evaluation image; evaluating the navigation-related properties to find a combination of at least a first navigation-related property and a second navigation-related property that fulfills a navigation requirement; and selecting at least a first navigation subarea related to the first navigation-related property and a second navigation subarea related to the second navigation-related property. The finger movement is then estimated using a sequence of first navigation images acquired using the first navigation subarea, and a sequence of second navigation images acquired using the second navigation subarea.

13 Claims, 6 Drawing Sheets

(56) References Cited

U.S. PATENT DOCUMENTS

| | | | |
|---|---|---|---|
| 7,162,059 B2* | 1/2007 | Yoo | G06F 3/0488 |
| | | | 342/357.29 |
| 2003/0123714 A1* | 7/2003 | O'Gorman | G06K 9/00026 |
| | | | 382/124 |
| 2004/0208348 A1* | 10/2004 | Baharav | G06K 9/00026 |
| | | | 382/124 |
| 2014/0300574 A1 | 10/2014 | Benkley et al. | |
| 2015/0185954 A1 | 7/2015 | Chang | |

* cited by examiner

METHOD AND SYSTEM FOR ESTIMATING FINGER MOVEMENT WITH SELECTION OF NAVIGATION SUBAREAS

CROSS REFERENCE TO RELATED APPLICATIONS

This application claims the benefit of Swedish Patent Application No. 1551620-6 filed Dec. 10, 2015. The disclosure of the above application is incorporated herein by reference in its entirety.

FIELD

The present invention relates to a method and system for estimating a finger movement using a fingerprint sensor.

BACKGROUND

Fingerprint sensors are sometimes used as "navigation tools", for example to move a cursor or pointer on a display or to perform selections of items presented on a display etc.

To be able to use a fingerprint sensor for such a navigation tool application, it is necessary to somehow track movement of the finger of a user across the fingerprint sensor.

According to one approach, described in U.S. Pat. No. 6,408,087, ridges and pores of a fingerprint are identified and motion of the ridges and pores between successive images of the fingerprint is detected.

For accurate and fast fingerprint-based navigation, it would be desirable to provide for a very fast readout of navigation images. Unless the size of the navigation images is reduced, this would result in an increase in the current consumption, which is not acceptable for various important applications.

If the size of the navigation images is reduced, it may, however, be difficult or even impossible to reliably identify and track ridges and pores as is suggested by U.S. Pat. No. 6,408,087.

There is thus a need for an improved estimation of a finger movement using a fingerprint sensor, and in particular for a fingerprint-based navigation that works well with smaller navigation images.

SUMMARY

In view of the above-mentioned and other drawbacks of the prior art, it is an object of the present invention to provide for an improved estimation of a finger movement using a fingerprint sensor, in particular when using smaller navigation images.

According to a first aspect of the present invention, it is therefore provided a method of estimating a finger movement using a fingerprint sensor, the method comprising the steps of: acquiring a navigation evaluation image from each of at least three navigation subareas of the fingerprint sensor; determining, for each of the navigation evaluation images, a navigation-related property of the navigation evaluation image; evaluating the navigation-related property of each of the navigation evaluation images to find a combination of at least a first navigation-related property of a first navigation evaluation image and a second navigation-related property of a second navigation evaluation image that fulfills a navigation requirement; selecting, for estimation of the finger movement, at least a first navigation subarea used for acquiring the first navigation evaluation image and a second navigation subarea used for acquiring the second navigation evaluation image; and estimating the finger movement using a sequence of first navigation images acquired using the first navigation subarea, and a sequence of second navigation images acquired using the second navigation subarea.

A "finger movement" should be understood as at least one of a finger movement direction and a finger speed.

The fingerprint sensor may, for example, be a capacitive fingerprint sensor detecting a measure indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The navigation subareas may advantageously be distinct and mutually spaced apart subareas of the total sensing area of the fingerprint sensor. In some embodiments, the navigation subareas may be distributed across the total sensing area of the fingerprint sensor. A suitable shape of each navigation subarea may be a rectangular shape, but other shapes are also feasible.

At least during the final step of the method according to embodiments of the present invention, the navigation images in the first sequence of navigation images are acquired using the first navigation subarea only, and the navigation images in the second sequence of navigation images are acquired using the second navigation subarea only. By using a small area of the fingerprint sensor only for estimating the finger movement, the current consumption can be kept down while still acquiring navigation images at a high acquisition rate, which is beneficial for the performance of the finger movement estimation.

Due to the small size of each navigation subarea, such as smaller than 1 mm$^2$, each navigation image may typically contain very limited useful fingerprint information. In particular, a navigation image acquired using a navigation subarea touched by a peripheral part of the fingerprint pattern of a finger may include only one or a few substantially parallel fingerprint ridges. Based on such a navigation image only, it may be very difficult to correctly estimate finger movement in the direction of the fingerprint ridge(s) using known techniques. The navigation subareas may have predefined sizes and/or locations.

The present invention is based upon the realization that finger movement can be correctly estimated even using very small navigation images, by defining at least three spatially separated navigation subareas, and selecting at least two of these navigation subareas for finger movement estimation based on acquisition and evaluation of navigation evaluation images from each of the defined navigation subareas.

In particular, the present inventors have realized that a reliable selection of navigation subareas can be achieved by determining a navigation-related property for each navigation evaluation image, and then evaluating the navigation-related properties to find a combination that is likely to allow estimation of finger movement in each predefined finger movement direction.

In a simple implementation of a finger movement estimation method, it could first be determined which navigation subareas are currently covered by the finger, and then selecting first and second navigation subareas based on mutual distance between navigation subareas.

For improved performance, it is, however, beneficial to actually analyze each navigation evaluation image to determine a navigation-related property of the navigation evaluation image, and then evaluate the navigation-related properties of the different navigation evaluation images to find a combination of navigation-related properties that is likely to provide for an accurate estimation of the finger movement. In particular, different combinations of navigation-related properties may be evaluated to find a combination that is sufficiently good and/or that is the best of the evaluated combinations.

According to various embodiments of the present invention, the navigation-related property of each of the navigation evaluation images may indicate expected correlations between the navigation evaluation image and subsequent images acquired using the navigation subarea used for acquiring the navigation evaluation image. Such subsequent images would correspond to displacement of the finger in different displacement directions.

Assume that an assessment of a first navigation evaluation image indicates that finger movement in a certain direction would be likely to result in high correlation between the first navigation evaluation image and a subsequent image taken after finger movement in that direction. In that case, the first navigation-related property indicates that the first navigation subarea having acquired the first navigation evaluation image is (currently) not suitable for estimation of finger movement in that direction.

If evaluation of a second navigation evaluation image, acquired using a second navigation subarea, indicates a likely correlation pattern that complements that of the above-mentioned first navigation evaluation image, then the combination of the correlation patterns may indicate that navigation images acquired using the first navigation subarea in combination with navigation images acquired using the second navigation subarea may provide for accurate finger movement estimation at least in each predefined finger movement direction.

For instance, the lowest estimated correlation for the first navigation evaluation image and the second navigation evaluation image may be evaluated for each predefined finger movement direction. If this lowest estimated correlation is below a predefined maximum expected correlation for each predefined finger movement direction, then the combination of the expected correlations for the first and second navigation evaluation images may be determined to fulfill the navigation requirement. Alternatively, or in combination, the combination resulting in, for instance, the lowest maximum correlation for any direction of the evaluated combinations may be considered to fulfill the navigation requirement.

In various embodiments, the step of determining, for each of the navigation evaluation images, the navigation-related property may comprise the step of estimating a dominant orientation in the navigation evaluation image.

The navigation-related property, which may for instance be an indication of the dominant orientation of fingerprint ridges in the navigation evaluation image, may then indicate that the navigation subarea having acquired the navigation evaluation image is currently unsuitable for finger movement estimation in the dominant orientation, and well suited for finger movement estimation in other directions, such as perpendicular to the dominant orientation etc.

There are various ways known to one of ordinary skill in the field of image processing for estimating the dominant orientation in an image. For instance, the dominant orientation can be computed using, at each pixel in the evaluated image, two simple perpendicular edge detectors, such as Prewitt or Sobel filters and then averaging.

The above-mentioned evaluation of navigation-related properties may then include requiring a minimum difference between a first dominant orientation in a first navigation evaluation image, and a second dominant orientation in a second navigation evaluation image. For a clear fingerprint images with good contrast, the orientations in the image will typically be given by the orientations of the fingerprint ridges.

Alternatively, or in combination, the one of the evaluated combinations exhibiting the largest difference between the first and second dominant orientations may be selected.

An example of a straight-forward way of evaluating combinations may be to take the scalar product of orientation vectors for pairs of navigation evaluation images. The smaller the scalar product is, the more different the dominant orientations are. A large difference in dominant orientations makes it likely that the combination of navigation subareas is currently suitable for accurate finger movement estimation in all directions.

There may advantageously be additional criteria for selection. For instance, navigation evaluation images exhibiting a well-defined dominant orientation may be disqualified due to poor contrast or low signal-to-noise ratio.

According to other embodiments, the correlations for different directions may be tested using the navigation evaluation images, before determining which navigation subareas to use for the finger movement estimation.

In these embodiments, the step of determining, for each of the navigation evaluation images, the navigation-related property may comprise the steps of: correlating the navigation evaluation image with each of a plurality of first partial fingerprint images displaced in different directions in relation to the navigation image; and determining the navigation-related property based on correlations for the different directions.

The above-mentioned correlation may be expressed in terms of a match parameter value, which may be any suitable value that indicates a correlation between two images. For instance, for each of the above-mentioned partial images, the sum of absolute differences (deviation) of all pixels of the navigation evaluation image and the partial image may be used as the match parameter value. A low deviation is equivalent to a high correlation.

The navigation estimation image and the partial fingerprint images may be acquired at the same time. For instance the navigation estimation image may be acquired using only a portion of the navigation subarea, and the partial fingerprint images may be acquired using other overlapping portions of the navigation subarea. Alternatively, a somewhat enlarged portion of the fingerprint sensor may be used for navigation evaluation only. Such an enlarged portion may, for example, consist of the navigation subarea and a ring of sensing elements one sensing element wide just outside the navigation subarea.

According to embodiments, furthermore, the step of estimating the finger movement may comprise the steps of: acquiring a first reference fingerprint image using at least a portion of the first navigation subarea at a first reference fingerprint image acquisition time; acquiring a second reference fingerprint image using at least a portion of the second navigation subarea at a second reference fingerprint image acquisition time; acquiring at least one first candidate fingerprint image using at least a portion of the first navigation subarea at each first candidate fingerprint image acquisition time in a time sequence of first candidate fingerprint image acquisition times; acquiring at least one second candidate fingerprint image using at least a portion of the second navigation subarea at each second candidate fingerprint image acquisition time in a time sequence of second candidate fingerprint image acquisition times; determining, for each of the first candidate fingerprint image acquisition times, a first match parameter value for each of a plurality of candidate finger movement directions, the first match parameter value being indicative of a correlation between a reference fingerprint image portion corresponding to a reference area of the first navigation subarea and a first candidate fingerprint image portion corresponding to a candidate area of the first navigation subarea, the candidate area being displaced in the candidate finger movement direction in relation to the reference area, resulting in a set of first match parameter values; determining, for each of the second candidate fingerprint image acquisition times, a second match parameter value for each of a plurality of candidate finger movement directions, the second match parameter value being indicative of a correlation between a reference fingerprint image portion corresponding to a reference area of the second navigation subarea and a second candidate fingerprint image portion corresponding to a candidate area of the second navigation subarea, the candidate area being displaced in the candidate finger movement direction in relation to the reference area, resulting in a set of second match parameter values; and estimating the finger movement based on the first set of match parameter values and the second set of match parameter values.

The candidate fingerprint images are always acquired after acquisition of the reference fingerprint image.

Using an analogy from a compass, the candidate finger movement directions may, for example, include north, northwest, west, southwest, etc.

The match parameter value indicating the correlation between a candidate fingerprint image portion and the reference fingerprint image portion may be higher or lower for a stronger correlation (similarity) between the candidate fingerprint image portion and the reference fingerprint image portion.

For further improvements in the finger movement estimation, the method according to embodiments of the invention may further comprise the steps of determining, for each of the candidate finger movement directions, a first local extremum match parameter value indicating a maximum correlation for the time sequence of first candidate fingerprint image acquisition times, determining, for each of the candidate finger movement directions, a second local extremum match parameter value indicating a maximum correlation for the time sequence of second candidate fingerprint image acquisition times, wherein the finger movement is estimated based on an evaluation of the determined first local extremum match parameters and second local extremum match parameters.

According to one example, the match parameter value may be a measure of the difference between the candidate fingerprint image portion and the reference fingerprint image portion. In that case, a lower value of the match parameter value indicates a stronger correlation between the fingerprint image portions, and the local extremum indicating a maximum correlation will be a local minimum. Analogously, the match parameter value may be a measure of the correspondence or likeness between the fingerprint image portions, and in that case the local extremum indicating a maximum correlation will be a local maximum.

According to embodiments at least two candidate finger movement directions that exhibit local extrema indicating maximum correlations, in respect of time, for the respective candidate finger movement directions may be evaluated.

As the finger moves across the surface of the fingerprint sensor, the partial fingerprint images acquired using the selected at least first and second navigation subareas will change, so that another selection of at least first and second navigation subareas may provide for better finger movement estimation.

According to embodiments of the present invention, the method may thus further comprise the steps of: evaluating at least one finger movement property; and acquiring, when the finger movement property fulfills a predefined criterion, a new navigation evaluation image from each of the at least three navigation subareas of the fingerprint sensor.

The finger movement property may be any property that indicates how far the finger has moved since the selection of navigation subareas was made. Accordingly, the finger movement property may be any one or a combination of finger movement distance, finger movement time, finger signal from the selected navigation subareas etc.

Consequently, the above-mentioned predefined criterion may be selected from the group comprising a maximum finger movement distance; a maximum finger movement time; and deterioration of the signal (such as average or total signal strength) from at least one of the first navigation subarea and the second navigation subarea. Deterioration of the finger signal may include partial or complete loss of the finger signal, or the finger signal may remain, but the quality of the navigation evaluation image may have been reduced. For instance, a measure indicative of the signal-to-noise ratio may have dropped below a predefined threshold.

When the predefined criterion has been fulfilled, new navigation estimation images are acquired from all navigation subareas, and the selection procedure according to embodiments of the present invention as described above is carried out to make a new selection of navigation subareas and proceed with the finger movement estimation using the newly selected navigation subareas.

According to a second aspect of the present invention, there is provided a fingerprint sensing system comprising: a fingerprint sensor having a fingerprint sensor area including at least three different navigation subareas; and processing circuitry for: acquiring a navigation evaluation image from each of the at least three navigation subareas of the fingerprint sensor; determining, for each of the navigation evaluation images, a navigation-related property of the navigation evaluation image; evaluating the navigation-related property of each of the navigation evaluation images to find a combination of at least a first navigation-related property of a first navigation evaluation image and a second navigation-related property of a second navigation evaluation image that fulfills a navigation requirement; selecting, for estimation of the finger movement, at least a first navigation subarea used for acquiring the first navigation evaluation image and a second navigation subarea used for acquiring the second navigation evaluation image; and estimating the finger movement using a sequence of first navigation images acquired using the first navigation subarea, and a sequence of second navigation images acquired using the second navigation subarea.

Advantageously, the fingerprint sensing system may be configured to acquire at least 3000 navigation images per second.

According to various embodiments, furthermore, the fingerprint sensor and the processing circuitry may be provided as a single semiconductor component. This provides for a low-cost finger navigation system, which is very compact and has a low power consumption.

Furthermore, for high fingerprint sensing performance and robustness, each of the sensing elements may comprise: a protective dielectric top layer to be touched by the finger; an electrically conductive sensing structure arranged underneath the top layer; and charge measuring circuitry connected to the sensing structure for providing a sensing signal indicative of a change of a charge carried by the sensing structure resulting from a change in a potential difference between the finger and the sensing structure. The charge measuring circuitry may comprise a charge amplifier.

Further embodiments of, and effects obtained through this second aspect of the present invention are largely analogous to those described above for the first aspect of the invention.

In summary, the present invention relates to a method of estimating a finger movement comprising acquiring a navigation evaluation image from each of at least three navigation subareas of a fingerprint sensor; determining, for each of the navigation evaluation images, a navigation-related property of the navigation evaluation image; evaluating the navigation-related properties to find a combination of at least a first navigation-related property and a second navigation-related property that fulfills a navigation requirement; and selecting at least a first navigation subarea related to the first navigation-related property and a second navigation subarea related to the second navigation-related property. The finger movement is then estimated using a sequence of first navigation images acquired using the first navigation subarea, and a sequence of second navigation images acquired using the second navigation subarea.

BRIEF DESCRIPTION OF THE DRAWINGS

These and other aspects of the present invention will now be described in more detail, with reference to the appended drawings showing an example embodiment of the invention, wherein.

DETAILED DESCRIPTION

Figure 1:
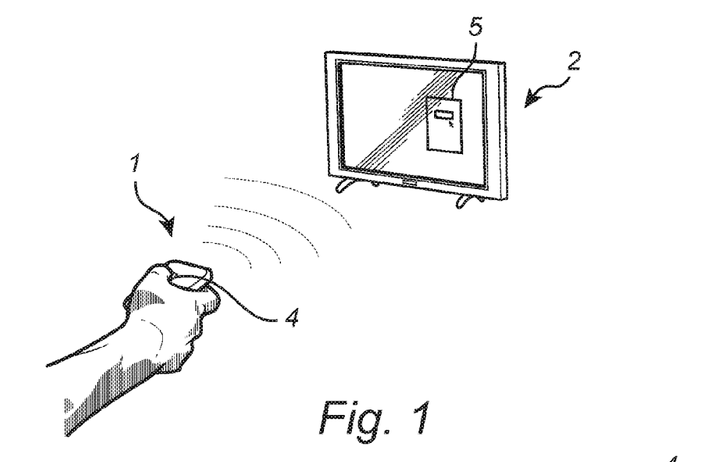
FIG. 1 schematically shows an exemplary application for the fingerprint sensing system according to embodiments of the present invention, in the form of a remote control for a television set.

FIG. 1 schematically shows an example application for the fingerprint sensing system according to embodiments of the present invention, in the form of a remote control device 1 for controlling operation of a television set 2. It should be noted that the remote control device 1 is an example application only, and that the fingerprint sensing system according to embodiments of the present invention could equally well be included in other electronic devices, such as mobile phones or computers etc.

Referring to FIG. 1, the remote control device 1 comprises a fingerprint sensing system 4, and a wireless transmitter, such as an infrared LED (not shown in FIG. 1). The television set 2 comprises a wireless receiver, such as a photodetector (not shown) for receiving signals transmitted by the remote control device 1. Based on the received signals, the television set 2 may be controlled to, for example, change channels or, as is schematically indicated in FIG. 1, select among options in a menu dialog 5.

Figure 2:
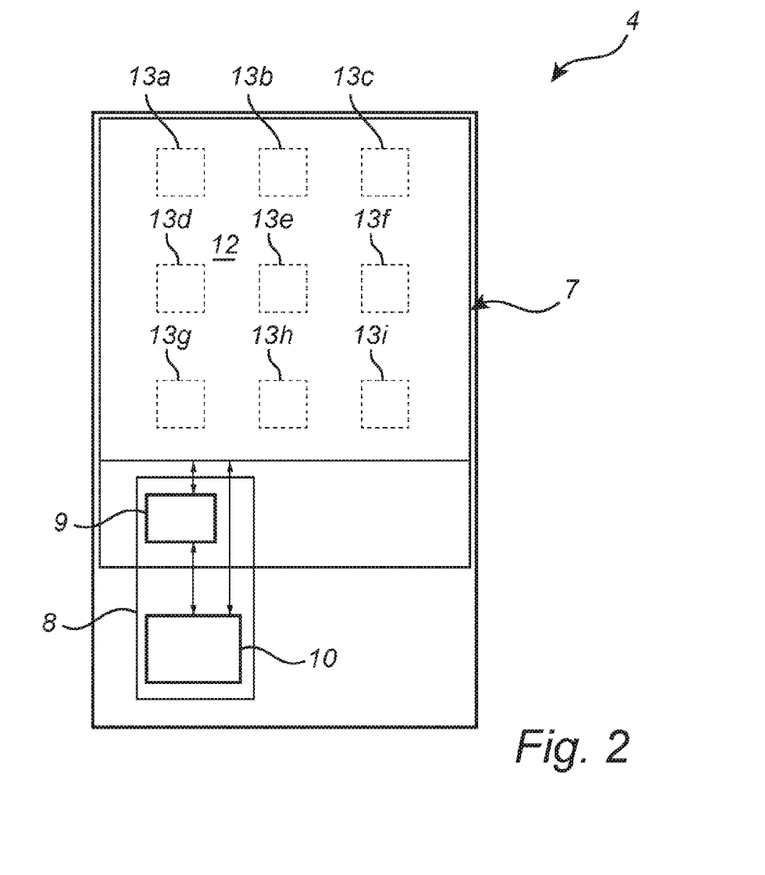
FIG. 2 is a schematic block diagram of the fingerprint sensing system comprised in the remote control in FIG. 1.

Referring to FIG. 2, which is a schematic block diagram of the fingerprint sensing system comprised in the remote control device 1 in FIG. 1, the fingerprint sensing system 4 comprises a fingerprint sensor 7, and processing circuitry 8. The processing circuitry 8 is here shown to include finger movement estimation circuitry 9 included in the fingerprint sensor 7, and a sensor controller 10 outside the fingerprint sensor 7. It should be understood that the sensor controller 10 may also be included in the fingerprint sensor component 7.

As is schematically shown in FIG. 2, the fingerprint sensor 7 has a fingerprint sensor area 12, including, in this case, nine different navigation subareas 13a-i.

As was explained further above in the Summary section, it is desirable to perform navigation using very limited image data, to allow a high frame rate while still keeping the current consumption very low. It is also desirable to keep the entire fingerprint sensor 7 small to keep down the component cost and facilitate integration into various electronic products.

Figure 3A:
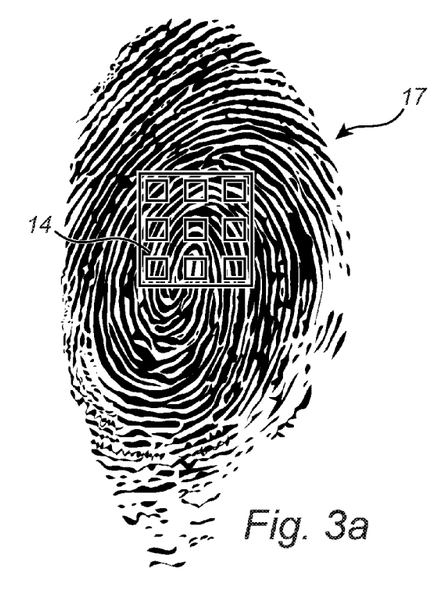
FIGS. 3a-c are example illustrations of a fingerprint image acquired using the fingerprint sensor of the fingerprint sensing system in FIG. 1 and FIG. 2.

An illustration of a representative size of the fingerprint sensor area 12 and the navigation subareas 13a-i in embodiments of the fingerprint sensing system according to the present invention is provided in FIG. 3a, where a fingerprint image 14 acquired using the full fingerprint sensor area 12, and navigation images 15a-i acquired using the respective navigation subareas 13a-i are shown together with a typical fingerprint 17.

Figures 3B, 3C:
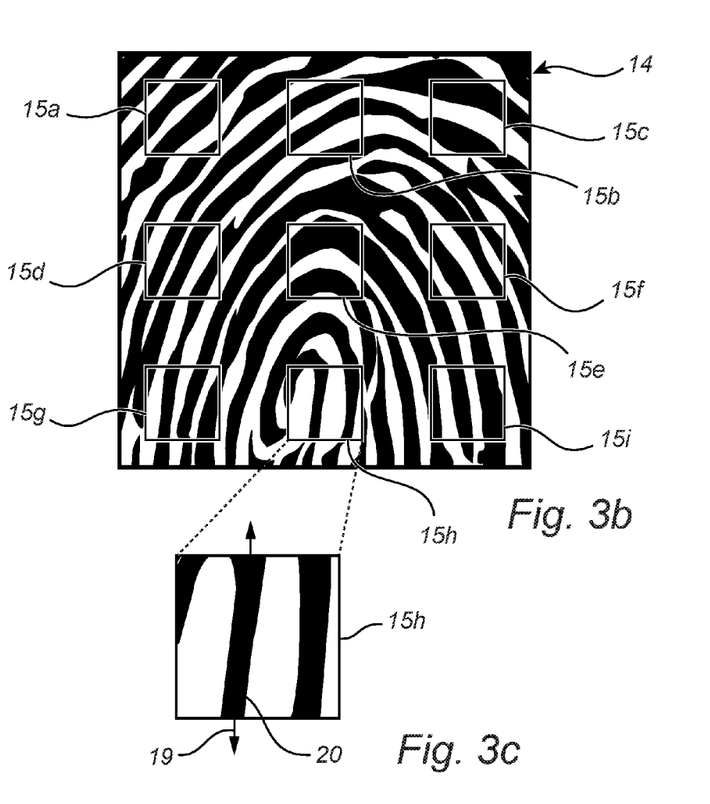

FIG. 3b is an enlargement of the fingerprint image 14, and the navigation images 15a-i, and FIG. 3c is a further enlarged view of an example navigation image 15h acquired using a single navigation subarea 13h.

As can be understood from FIGS. 3a-c, the fingerprint sensor area 12 is rather small in relation to the fingerprint 17, and each navigation subarea 13a-i is even small in relation to fingerprint features. Considering, for example, the enlarged navigation image 15h in FIG. 3c, it is easy to understand that it may be difficult to accurately estimate finger movement in a direction that is in parallel with the dominant orientation 19 of the fingerprint ridge 20 in the navigation image 15h.

The situation can be improved by using more than one of the navigation images 15a-i, but the selection of navigation subareas 13a-i will be critical to the performance of the finger movement estimation. If, for instance, navigation images 15h and 15i are used for finger movement estimation, it will still be difficult to accurately estimate movement in a direction parallel with the above-mentioned dominant orientation 19.

Embodiments of the present invention provide for a more accurate estimation of the finger movement direction as described herein.

A method of estimating a finger movement direction according to an example embodiment of the present invention, using the fingerprint sensing system in FIG. 2, will now be described with reference to the schematic flow-chart in FIG. 4, as well as to the illustrations provided in FIGS. 5a-b, FIGS. 6a-b, FIG. 7, and FIG. 8.

In a first step 100, a navigation evaluation image 15a-i is acquired from each of the navigation subareas 13a-i, by the processing circuitry 8. For instance, the finger movement estimation circuitry 9 may acquire the navigation evaluation images 15a-i and pass the images on to the sensor controller 10, or the sensor controller 10 may directly acquire the navigation evaluation images 15a-i.

In the subsequent step 101, a navigation-related property is determined, by the processing circuitry 8, of each of the acquired navigation evaluation images 15a-i. The purpose of the determination of the navigation-related property for each navigation evaluation image 15a-i is to improve the selection of two or more of the navigation evaluation images 15a-i.

It will be evident to one of ordinary skill in the relevant art that there are several ways of processing the navigation evaluation images 15a-i to obtain a navigation-related property that can aid the selection process.

Two exemplary ways of determining a suitable navigation-related property for a navigation evaluation image 15a-i will now be described with reference to FIGS. 5a-b, FIGS. 6a-b, and FIG. 7.

Figure 5A:
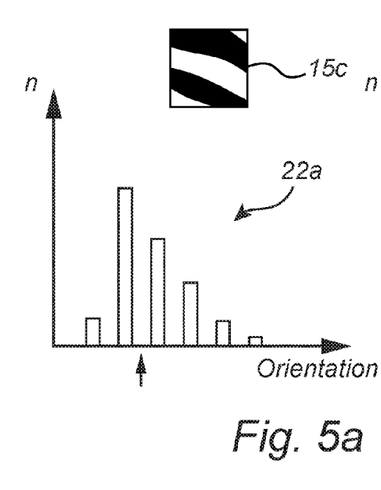
FIGS. 5a-b schematically illustrate evaluation of a first combination of navigation evaluation images using a first example evaluation method.
Figure 5B:
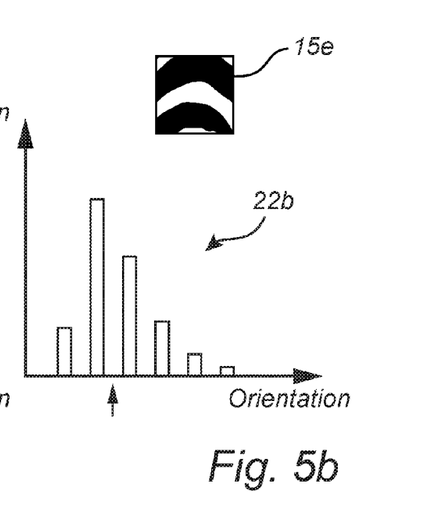

According to one example embodiment, the current expected usability of the different navigation subareas 13a-i for finger movement estimation in different finger movement directions can be determined by calculating the dominant orientation in the different navigation evaluation images 15a-i. Referring first to FIGS. 5a-b, the respective dominant orientations in the navigation evaluation images 15c and 15e are illustrated.

By using two simple perpendicular edge detectors, such as the well-known Prewitt or Sobel filters at each pixel in the navigation evaluation images, and then averaging, the local gradient orientation for each pixel can be determined. An example histogram 22a of the local gradient orientations for the navigation evaluation image 15c is shown below the image 15c in FIG. 5a, and an example histogram 22b of the local gradient orientations for the navigation evaluation image 15e is shown below the image 15e in FIG. 5b. The dominant orientation for the respective navigation evaluation image 15c, 15e is indicated by the arrow underneath the histogram 22a, 22b.

Figure 6A:
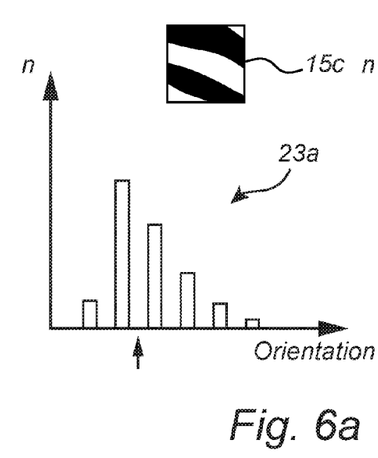
FIGS. 6a-b schematically illustrate evaluation of a second combination of navigation evaluation images using the first example evaluation method.
Figure 6B:
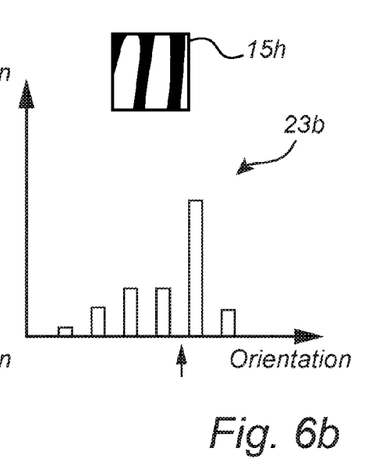

In FIGS. 6a-b, the orientations in the navigation evaluation image 15c in FIG. 5a with histogram 23a (same as histogram 22a in FIG. 5a) are instead compared with orientations in the navigation evaluation image 15h with histogram 23b. As in FIGS. 5a-b, the dominant orientations of the respective navigation evaluation images 15c, 15h are indicated by arrows underneath the histograms 23a, 23b.

In the above-described first embodiment, the navigation-related property is thus the dominant orientation in each navigation-related image 15a-i.

According to another example embodiment, the current expected usability of the different navigation subareas 13a-i for finger movement estimation in different finger movement directions can be determined by directly correlating each navigation evaluation image with partial fingerprint images displaced in different directions in relation to the navigation evaluation image.

Figure 7:
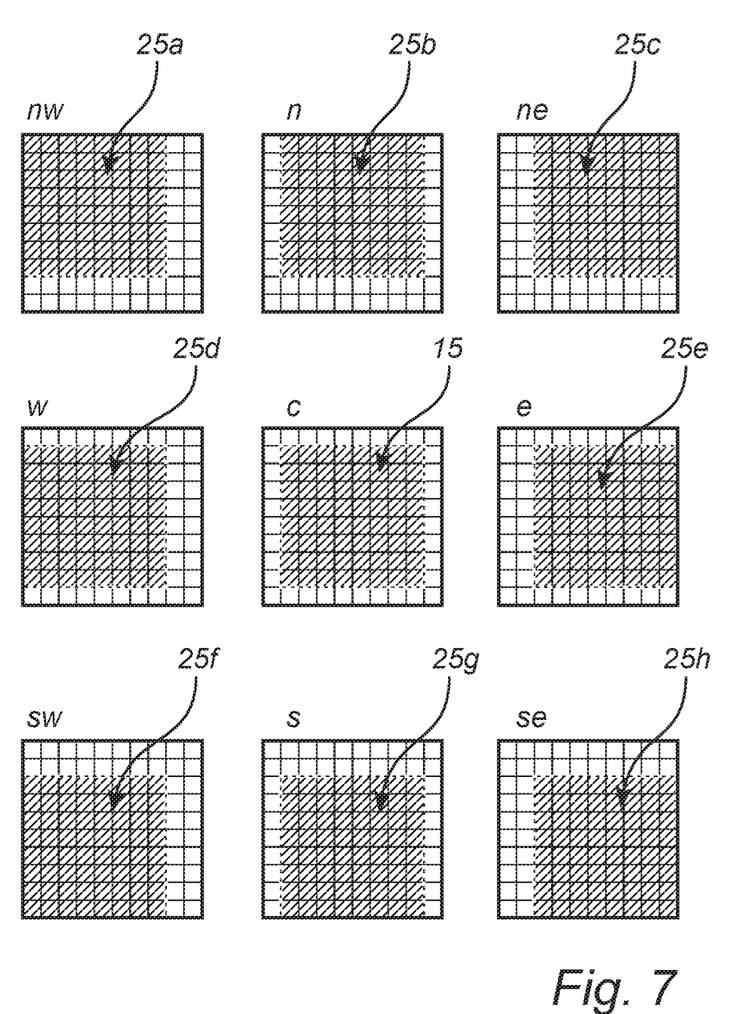
FIG. 7 schematically illustrates a second example evaluation method, as well as an example procedure for finger movement estimation method.

FIG. 7 schematically illustrates a representative navigation evaluation image 15 (the 8×8 pixel hatched area in the center square in FIG. 7), and eight additional partial images 25a-h (hatched areas) representing displacement of the finger in eight different directions, here identified as northwest (nw), north (n), northeast (ne), west (w), east (e), southwest (sw), south (s), and southeast (se).

By correlating the navigation evaluation image 15 with each of the different partial fingerprint images 25a-h, for instance using block matching, a measure indicative of the similarity (or a measure indicative of the deviation) between the navigation evaluation image and each of the different partial fingerprint images 25a-h can be obtained.

In the above-described second embodiment, the navigation-related property is thus this measure of the correlation between the navigation evaluation image 15 and the partial images 25a-h indicating displacement in different directions.

Figure 4:
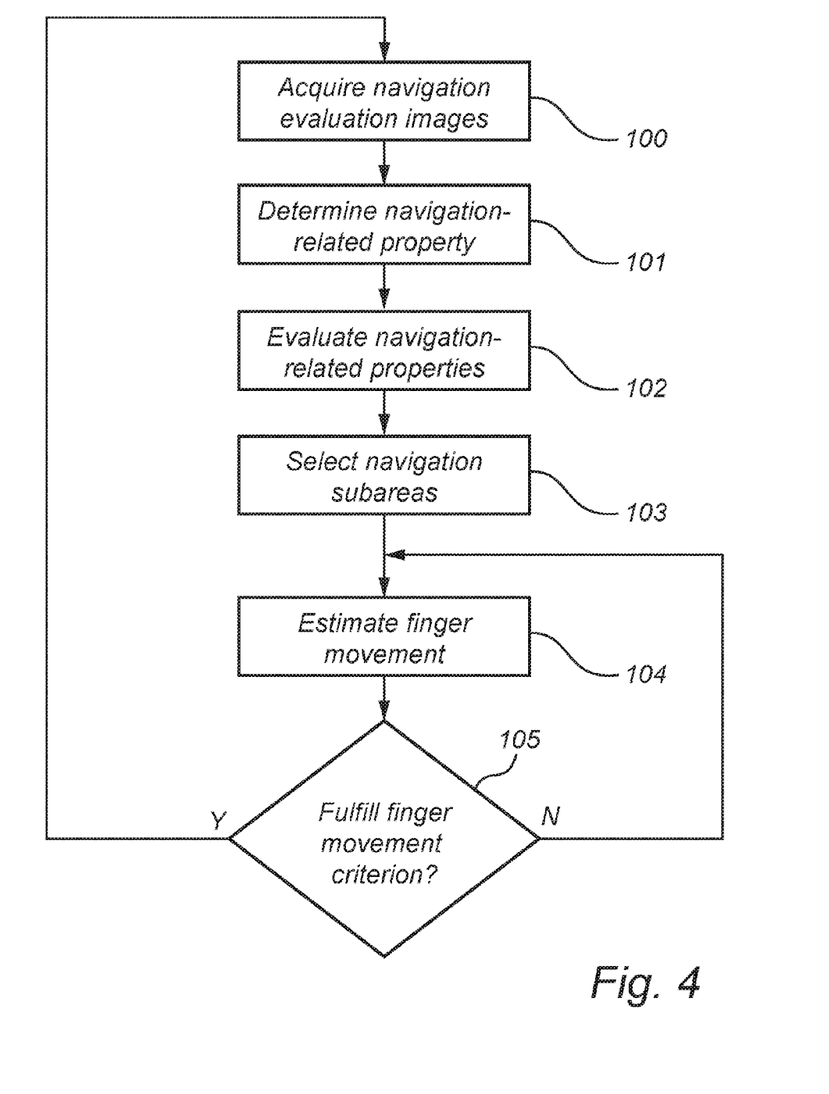
FIG. 4 is a flow-chart schematically illustrating a method of estimating a finger movement according to an example embodiment of the present invention.

Returning to the flow-chart in FIG. 4, the navigation-related property of each of the navigation evaluation images 15a-i is evaluated in step 102 to find a combination of at least a first navigation-related property of a first navigation evaluation image and a second navigation-related property of a second navigation evaluation image that fulfills a navigation requirement.

According to one embodiment, the evaluation of step 102 may involve to compare the dominant orientations of different navigation evaluation images with each other, and to determine if the dominant orientations are sufficiently different, or to determine which combination of navigation evaluation images has the most different dominant orientations.

Referring first to FIGS. 5a-b, it can be seen that the dominant orientations in the navigation orientation images 15c and 15e are rather similar, which means that the combination of these navigation orientation images 15c and 15e is not likely to provide for accurate finger movement estimation in directions substantially along the dominant orientations in these navigation orientation images 15c and 15e. The dominant orientations for navigation evaluation image 15c and navigation evaluation image 15e are too similar for the combination to fulfill the navigation requirement.

Turning now to FIGS. 6a-b, it can be seen that the dominant orientations in the navigation orientation images 15c and 15h are very different (substantially perpendicular), which means that the combination of these navigation orientation images 15c and 15h is likely to provide for accurate finger movement estimation in all directions. The dominant orientations for navigation evaluation image 15c and navigation evaluation image 15h may fulfill the navigation requirement, depending on if the navigation requirement has been predefined to be a minimum difference in dominant orientation, or the combination with the largest difference in dominant orientation should be considered to have fulfilled the navigation requirement.

To provide for an efficient evaluation of different combinations, the scalar product of the dominant orientations may be determined for each combination, and the combination resulting in the lowest scalar product (closest to orthogonal) may be considered to fulfill the navigation requirement.

According to another embodiment, correlation between each of the navigation evaluation images 15a-i and partial images 25a-h as described above with reference to FIG. 7 can be used to find a combination of navigation evaluation images with a sufficiently low correlation for all directions (or the lowest maximum correlation), which can be considered to fulfill the navigation requirement.

In the next step 103, the navigation subareas that were used to acquire the combination of navigation evaluation images that fulfilled the navigation requirement are selected for finger movement estimation. In the example of FIGS. 3a-c, for example, the navigation subareas 13c and 13h (used to acquire navigation evaluation images 15c and 15h) may be selected for finger movement estimation.

Thereafter, in step 104, the finger movement is estimated using a sequence of first navigation images acquired using the first navigation subarea, and a sequence of second navigation images acquired using the second navigation subarea.

The finger movement may be estimated using any estimation suitable for relatively small areas. For instance, correlation using block matching as was briefly described above with reference to FIG. 7 may be used.

The sequence of first navigation images may comprise a first reference image and a sequence of first candidate images for each direction, and the sequence of second navigation images may comprise a second reference image and a sequence of second candidate images for each direction. The first reference image and the second reference image may be treated as a single combined reference image, and each set of first and second candidate images may also be treated as a single combined candidate image.

To provide for a highly accurate estimation of the finger movement, at least three candidate images may be acquired during the time it takes for the finger to move a distance corresponding to one pixel of the fingerprint sensor array 12. Then, the development over time of the match parameter values (correlation) can be evaluated to estimate the direction of finger movement to be the direction exhibiting the strongest maximum correlation between the reference image and the sequence of candidate images.

The match parameter value may be any suitable value that indicates a correlation between two images. In the presently illustrated example, the sum of absolute differences (deviation) of all 8×8 pixels of the candidate fingerprint image portion and the reference fingerprint image portion is used as match parameter value.

Figure 8:
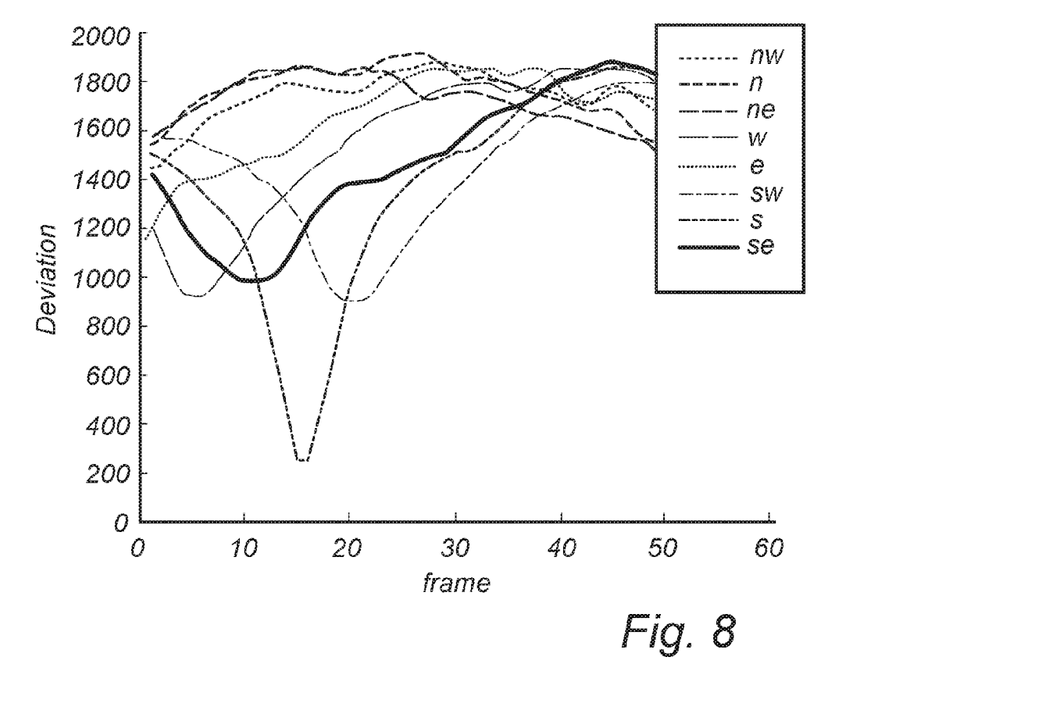
FIG. 8 schematically illustrates an example finger movement estimation using the selected navigation subareas.

Examples of the development over time of the match parameter values (in this case deviations) for the different candidate finger movement directions are shown in FIG. 8, where the different candidate finger movement directions are denoted by different points of the compass as was also described above with reference to FIG. 7.

In the example of FIG. 8, the local minimum for the deviation is determined for each of the directions west, southwest, south, and southeast, and the finger movement can be estimated based on the local minima for these directions. In this case, it is determined that the candidate movement direction "south" exhibits the best correlation at approximately the 16th candidate fingerprint image acquisition time. Hence, the finger movement is estimated to be in the "south" direction.

The finger movement estimation proceeds using the selected at least first and second navigation subareas as long as these subareas are likely to provide an accurate estimation. This is determined in step 105 by evaluating at least one finger movement property, such as the finger movement distance since the start of the finger movement estimation following the selection of navigation subareas in step 103 or the time since the start of the finger movement estimation following the selection of navigation subareas in step 103. If the finger has not moved very far or finger movement estimation with the selected navigation subareas has not been carried out for a "long" time, the method returns to step 104 and continues to estimate finger movement using the selected navigation subareas. If, on the other hand, it is determined in step 105 that the finger movement property fulfills the finger movement criterion, the method returns to step 100 in which new navigation evaluation images are acquired.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of estimating a finger movement using a fingerprint sensor, said method comprising the steps of:
acquiring a navigation evaluation image from each of at least three navigation subareas of said fingerprint sensor;
determining, for each of said navigation evaluation images, a navigation-related property of said navigation evaluation image;
evaluating said navigation-related property of each of said navigation evaluation images to find a combination of at least a first navigation-related property of a first navigation evaluation image and a second navigation-related property of a second navigation evaluation image that fulfills a navigation requirement;
selecting, for estimation of said finger movement, at least a first navigation subarea used for acquiring said first navigation evaluation image and a second navigation subarea used for acquiring said second navigation evaluation image; and
estimating said finger movement using a sequence of first navigation images acquired using said first navigation subarea, and a sequence of second navigation images acquired using said second navigation subarea.

2. The method according to claim 1, wherein:
said navigation-related property of each of said navigation evaluation images indicates expected correlations between said navigation evaluation image and subsequent images acquired using the navigation subarea used for acquiring said navigation evaluation image, said subsequent images corresponding to displacements of said finger in different displacement directions.

3. The method according to claim 2, wherein each of a plurality of combinations of navigation-related properties is evaluated, and the evaluated combination providing the lowest maximum expected correlation for a plurality of predefined navigation directions is determined to fulfill said navigation requirement.

4. The method according to claim 1, wherein:
the step of determining, for each of said navigation evaluation images, said navigation-related property comprises the step of:

estimating a dominant orientation in said navigation evaluation image.

5. The method according to claim 4, wherein said navigation requirement includes a requirement for a minimum difference between a first dominant orientation and a second dominant orientation.

6. The method according to claim 4, wherein said navigation requirement includes a requirement for having a largest difference between a first dominant orientation and a second dominant orientation among evaluated combinations of dominant orientations.

7. The method according to claim 1, wherein:
the step of determining, for each of said navigation evaluation images, said navigation-related property comprises the steps of:
correlating said navigation evaluation image with each of a plurality of first partial fingerprint images displaced in different directions in relation to said navigation evaluation image; and
determining said navigation-related property based on correlations for the different directions.

8. The method according to claim 7, wherein:
said navigation evaluation image and said partial fingerprint images are acquired at the same time.

9. The method according to claim 1, wherein the step of estimating said finger movement comprises the steps of:
acquiring a first reference fingerprint image using at least a portion of said first navigation subarea at a first reference fingerprint image acquisition time;
acquiring a second reference fingerprint image using at least a portion of said second navigation subarea at a second reference fingerprint image acquisition time;
acquiring at least one first candidate fingerprint image using at least a portion of said first navigation subarea at each first candidate fingerprint image acquisition time in a time sequence of first candidate fingerprint image acquisition times;
acquiring at least one second candidate fingerprint image using at least a portion of said second navigation subarea at each second candidate fingerprint image acquisition time in a time sequence of second candidate fingerprint image acquisition times;
determining, for each of said first candidate fingerprint image acquisition times, a first match parameter value for each of a plurality of candidate finger movement directions, said first match parameter value being indicative of a correlation between a reference fingerprint image portion corresponding to a reference area of said first navigation subarea and a first candidate fingerprint image portion corresponding to a candidate area of said first navigation subarea, said candidate area being displaced in said candidate finger movement direction in relation to said reference area, resulting in a set of first match parameter values;
determining, for each of said second candidate fingerprint image acquisition times, a second match parameter value for each of a plurality of candidate finger movement directions, said second match parameter value being indicative of a correlation between a reference fingerprint image portion corresponding to a reference area of said second navigation subarea and a second candidate fingerprint image portion corresponding to a candidate area of said second navigation subarea, said candidate area being displaced in said candidate finger movement direction in relation to said reference area, resulting in a set of second match parameter values; and
estimating said finger movement based on said first set of match parameter values and said second set of match parameter values.

10. The method according to claim 9, further comprising the steps of:
determining, for each of said candidate finger movement directions, a first local extremum match parameter value indicating a maximum correlation for said time sequence of first candidate fingerprint image acquisition times,
determining, for each of said candidate finger movement directions, a second local extremum match parameter value indicating a maximum correlation for said time sequence of second candidate fingerprint image acquisition times,
wherein said finger movement is estimated based on an evaluation of said determined first local extremum match parameters and second local extremum match parameters.

11. The method according to claim 1, further comprising the steps: of:
evaluating at least one finger movement property; and
acquiring, when said finger movement property fulfills a predefined criterion, a new navigation evaluation image from each of said at least three navigation subareas of said fingerprint sensor.

12. The method according to claim 11, wherein said predefined criterion is selected from the group comprising:
a maximum finger movement distance;
a maximum finger movement time; and
deteriorations of finger signal from at least one of said first navigation subarea and said second navigation subarea.

13. A fingerprint sensing system comprising:
a fingerprint sensor having a fingerprint sensor area including at least three different navigation subareas; and
processing circuitry for:
acquiring a navigation evaluation image from each of said at least three navigation subareas of said fingerprint sensor;
determining, for each of said navigation evaluation images, a navigation-related property of said navigation evaluation image;
evaluating said navigation-related property of each of said navigation evaluation images to find a combination of at least a first navigation-related property of a first navigation evaluation image and a second navigation-related property of a second navigation evaluation image that fulfills a navigation requirement;
selecting, for estimation of said finger movement, at least a first navigation subarea used for acquiring said first navigation evaluation image and a second navigation subarea used for acquiring said second navigation evaluation image; and
estimating said finger movement using a sequence of first navigation images acquired using said first navigation subarea, and a sequence of second navigation images acquired using said second navigation subarea.

* * * * *